Jan. 25, 1955　　W. C. ARKELL ET AL　　2,700,227
TRAINING APPARATUS
Filed July 30, 1951　　4 Sheets-Sheet 1
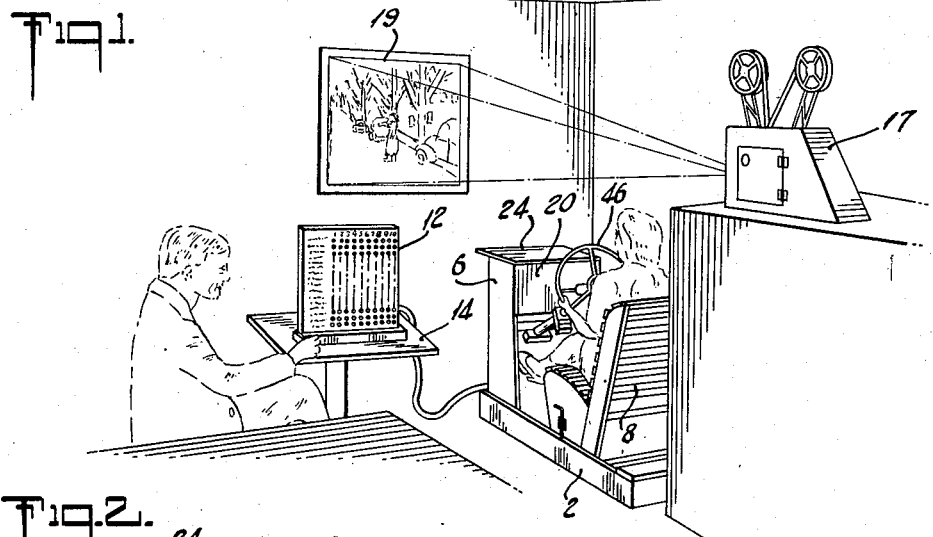
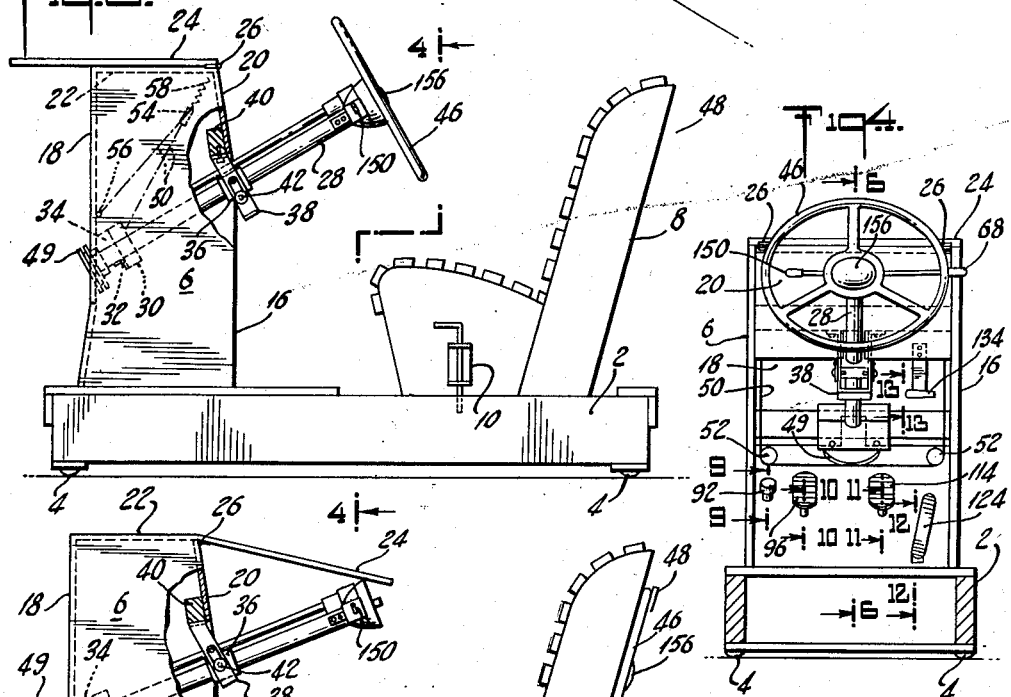
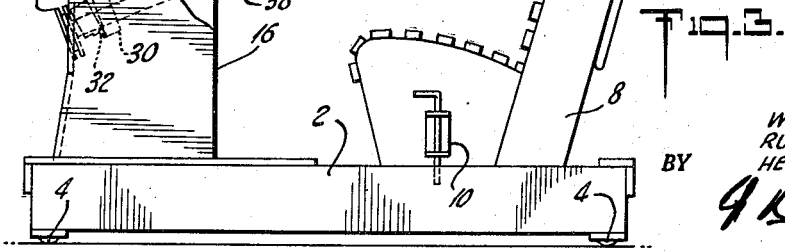
INVENTORS
WILLIAM C. ARKELL
RUDOLPH F. MALLINA
HERBERT J. BRAUN
BY
ATTORNEY.

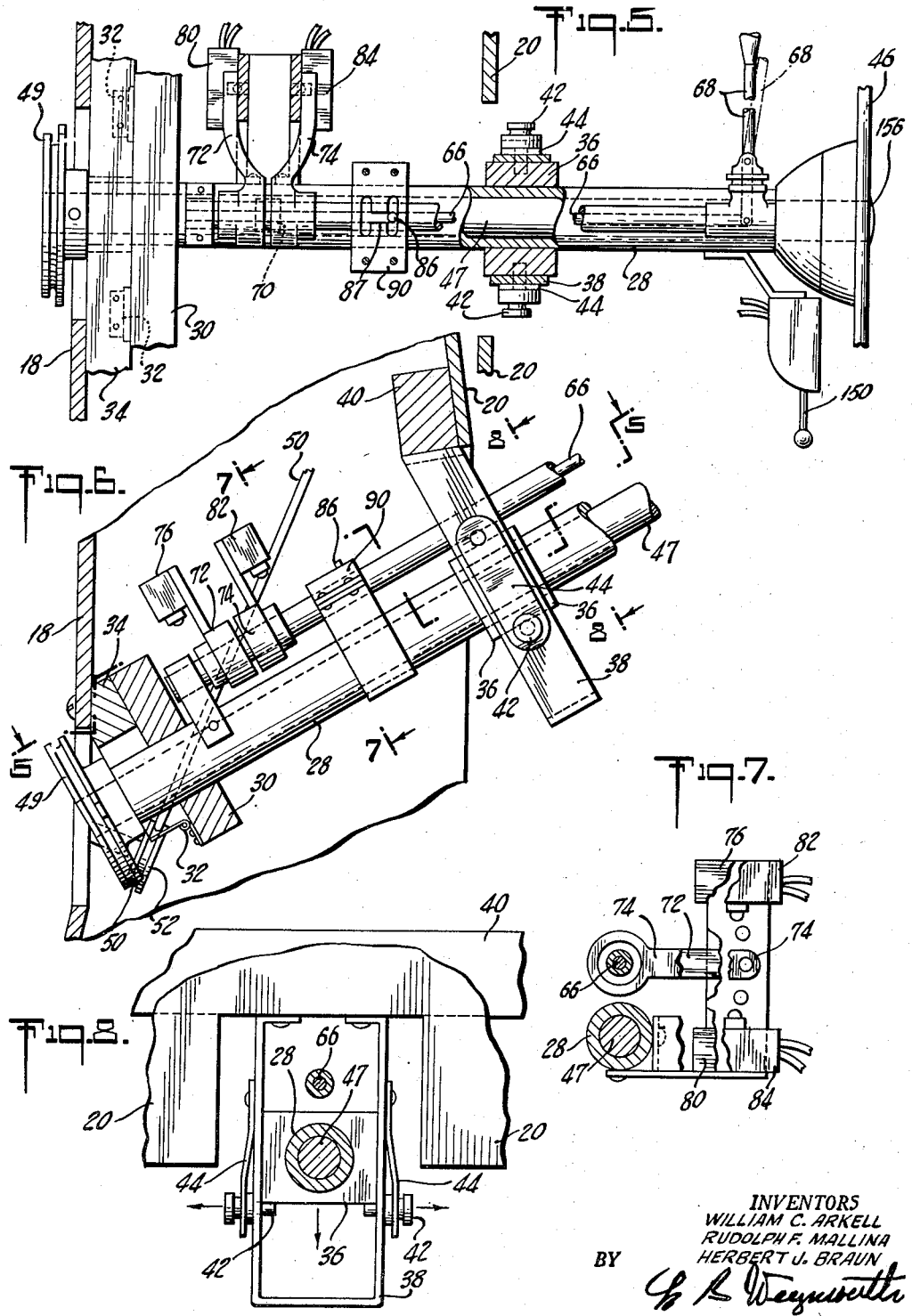

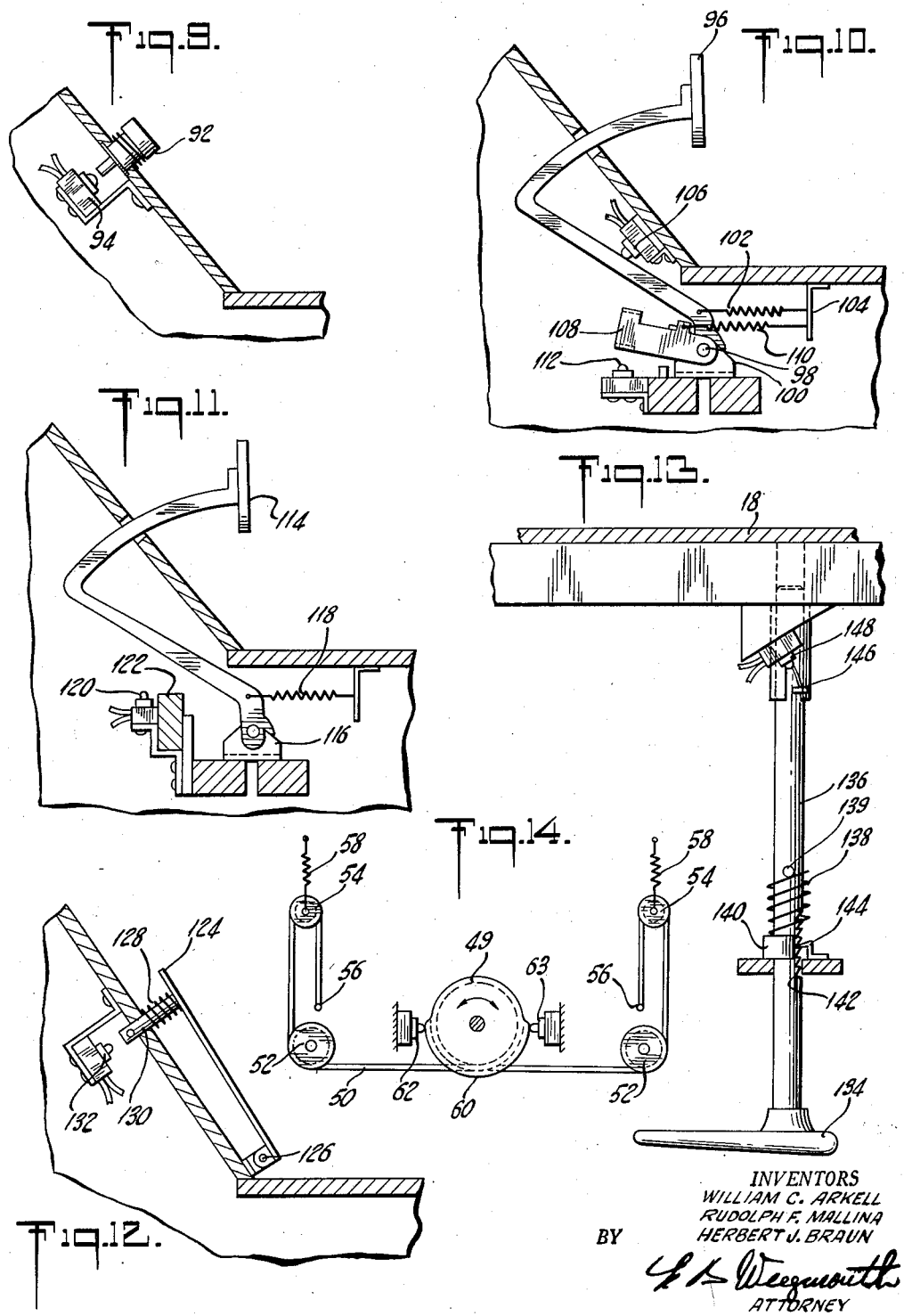

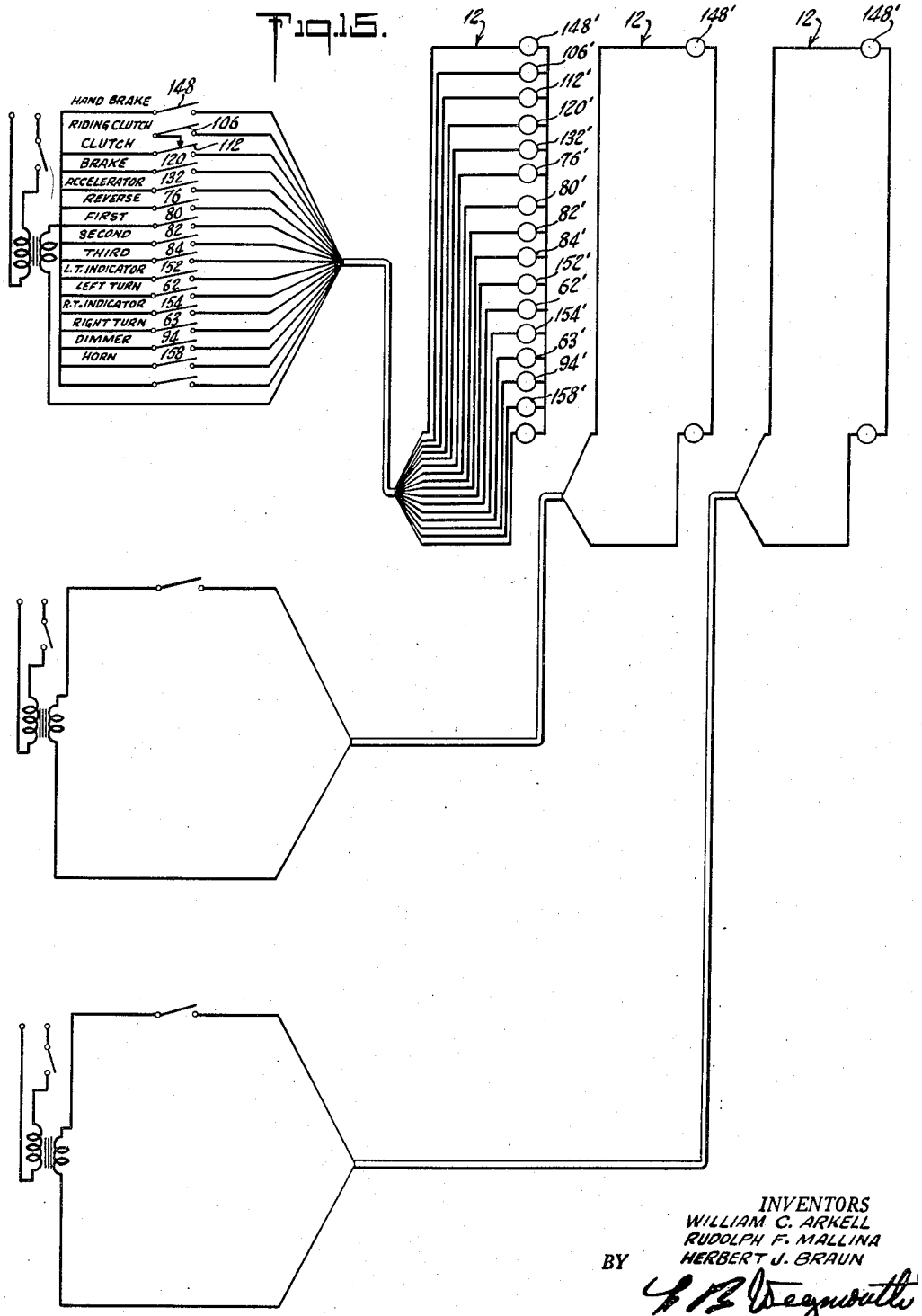

United States Patent Office 2,700,227
Patented Jan. 25, 1955

2,700,227

TRAINING APPARATUS

William C. Arkell, Englewood, N. J., and Rudolph F. Mallina, Hastings on Hudson, and Herbert J. Braun, Queens Village, N. Y., assignors to New York University, New York, N. Y., a corporation of New York Application July 30, 1951, Serial No. 239,348

2 Claims. (Cl. 35—11)

The present invention relates to apparatus for training in automobile driving.

The principal object of the invention is to provide apparatus of this character which is especially adapted for use in training a number of students simultaneously, and which is of simple and inexpensive construction.

The several features of the invention, whereby this and other objects may be attained, will be readily understood from the following description and accompanying drawings, in which:

Figure 1 is a view in perspective of the apparatus in its preferred form;

Fig. 2 is a side view, partly in section, of a unit comprising a compartment containing the controls and a seat, in simulation of the driving compartment, controls and driver's seat of an automobile.

Fig. 3 is a similar view but showing certain parts in different positions;

Fig. 4 is a sectional elevation taken on the line 4—4 of Fig. 2;

Fig. 5 is a plan view, partly in section and partly broken away, of the steering column and steering wheel, and associated parts of the unit illustrated in Fig. 2, the section being taken substantially on the line 5—5 of Fig. 6;

Fig. 6 is a sectional view, partly in elevation and on an enlarged scale, taken substantially on the line 6—6 of Fig. 4;

Fig. 7 is a detail sectional view, with certain parts broken away, taken substantially on the line 7—7 of Fig. 6;

Fig. 8 is a detail sectional view taken on the line 8—8 of Fig. 6;

Figs. 9, 10, 11, 12 and 13 are detail sectional views, partly in elevation, taken on the lines 9—9, 10—10, 11—11, 12—12 and 13—13 of Fig. 4.

Fig. 14 is a detail transverse sectional elevation of the lower end of the steering column and associated parts; and Fig. 15 is a diagrammatical view of electric circuits that may be employed in the apparatus, there being shown the circuits for three units.

The apparatus as illustrated in Fig. 1 comprises a portable unit consisting of a base 2 having supporting casters 4, a compartment 6 in which the controls are mounted, and a seat 8 adjustable on the base toward and from the said compartment, a suitable fastening device 10 being provided for holding the seat in adjusted position. The apparatus is further provided with a lamp panel 12 which may be conveniently supported on the instructor's desk or table 14 remote from the unit. This panel contains a row of signal lamps with the several lamps in a row respectively connected with the controls so as to be operated thereby to indicate the positions of the controls as they are operated by the student. While only a single unit is illustrated in Fig. 1 there may be ten or more units in the class room arranged one behind the other, and the several sets of controls of the units may similarly be connected so as to operate signal lamps on the panel 12, and thus the instructor may supervise the training of a group of students at one time. The panel 12 is shown provided with signal lamps for a battery of ten units.

In using the apparatus, a motion picture projector 17 may be employed to project on a screen 19 a continuously changing scene, as of an automobile driven along a street and encountering various emergency situations, the pictures being made with the camera in such position as to furnish a "driver's eye" view. The instructor may readily determine from the light panel whether the several students operate the controls properly in the various emergencies as they are presented on the screen.

The compartment 6 is in simulation of the driving compartment of a conventional automobile. The compartment is provided with side walls 16, rear wall 18, a front panel 20 simulating the instrument panel of an automobile, and a top which has a rear section 22 and a front section 24 which is connected to the rear section by means of hinges 26. When the unit is not in use, the front section 24 of the top may be swung down into the position shown in Fig. 3. When the unit is in use, the section 24 is swung back over the rear section 22.

A steering column 28 and associated parts which are facsimiles of the corresponding steering column and parts of an automobile is supported in the cabinet 6. The inner end of the steering column extends through an aperture in a block 30 which is hinged at 32 to a yoke 34 secured to the rear wall 18 of the compartment. The forward portion of this steering column extends through an aperture in a block 36 which is mounted in a U-shaped hanger 38 secured to a bar 40 that is secured to the inner side of the instrument panel 20. The block 36 is held with the steering column in the position shown in Fig. 2, by means of pins 42 which extend through apertures in the hanger 38 and are mounted on the ends of leaf-springs 44 secured to the sides of the hangers. Upon pulling the pins 42 outwardly so as to release the block 36, the block carrying the steering column therewith may be moved down into position shown in Fig. 3 with the block resting upon the cross-bar at the lower end of the hanger 38. With the steering column in its lowered position, the steering wheel 46 thereon may be removed and hung on a hook 48 on the back of the seat 8. The front section 24 of the top of the compartment may then be swung down upon the outer end of the steering column so as to be supported thereby, and thus the compartment 6 may serve as a student desk.

When it is desired to use the unit, the front section 24 of the top of the compartment may be swung up over the rear section, the steering wheel 46 again mounted on the steering column, and the column returned to the position shown in Fig. 2 and held in that position by the pins 42.

The steering wheel is secured on the end of the usual post 47 which extends through the column 28. In order that the turning of the steering wheel may simulate the turning of the wheel of an automobile, a grooved pulley 49 is secured on the inner end of the post 47 and receives a cord 50 which passes over idlers 52 and grooved pulleys 54, and has its ends 56 secured to the rear wall of the cabinet. The pulleys 54 may be guided by any suitable means for vertical movement, and are pressed upwardly by means of coiled springs 58. With this construction, the springs 58 yieldingly resist turning of the steering wheel and post and when the wheel is released returns the wheel to its normal position.

The pulley 49 has a segmental cam surface 60 on the periphery thereof which is adapted to engage the operating members of diametrically opposed micro-switches 62 and 63. These micro-switches are in circuit connection with lamps 62' and 63' respectively, on the light panel 12. When the steering wheel is in neutral or normal position, the switches 62 and 63 maintain the circuit connections with the lamps 62' and 63' broken. When the steering wheel is turned in a counter-clockwise direction to make a left turn, the cam 60 rides out of contact with the switch 62 and the circuit connection with the lamp 62' is closed. When the steering wheel is again returned to normal position this light is turned off. When the steering wheel is turned in a clockwise direction to make a right turn the cam 60 moves out of contact with the switch 63, thus closing the circuit of the lamp 63'. By this means, the supervisor readily determines in which direction the steering wheel of each unit is turned, or if it is in neutral position.

The steering column is provided with the usual gear shifting rod 66 and operating lever 68. This rod is adapted to be connected through the usual coupling means 70 with arms 72 and 74 corresponding to the gear shift arms of a conventional automobile. Upon shifting the arm 72 axially and turning it by means of the lever 68 in the usual manner to reverse position, the end of the arm engages a contact member of a micro-switch 76 to close the circuit connection with a lamp 76' and thus effect lighting of the lamp. When this arm is returned to neutral position, the micro-switch is released to open the circuit. Upon shifting the arm 72 axially and turning it to first speed position by means of the shift lever 68, the arm engages the contact member of a micro-switch 80 to close the circuit connection with a lamp 80' and maintain it closed so long as the arm 72 is in first position. Upon shifting the arm 74 axially and turning it to second speed position, a micro-switch 82 is operated by the arm to close the circuit with a lamp 82'. Upon further turning of the arm 74 to third or high speed position a micro-switch 84 is operated thereby to close the circuit with a lamp 84'. The longitudinal shifting and turning of the gear shifting rod 68 may be controlled in simulation with the shifting of the gears of a conventional automobile, by means of a lateral pin 86 on the rod which is adapted to be received in an H-shaped slot 87 in a block 90.

Referring to Fig. 9, the button 92 is the usual button dimmer on the floor of a conventional automobile. Upon depressing this button, the circuit connections with a lamp 94' are closed, the circuit remaining closed until the button is again depressed.

A clutch pedal 96 is pivoted on a pin 98 on a block 100, and is held in retracted position by means of a spring 102 having one end secured to the pedal and its other end to a bracket 104. Normally the lever 96 engages the contact member of the micro-switch 106 so as to maintain the circuit connection with a lamp 106' open. Upon depressing the pedal 96 the circuit is closed thus indicating to the instructor when the student is "riding" the clutch. Upon depressing the clutch pedal 96 in shifting the gears, the pedal acts through a lever 108 pivoted on the pin 98 and held in raised position by means of a spring 110, to operate a micro-switch 112 to close the circuit connection with a lamp 112', thus indicating to the instructor when the clutch pedal is thus operated. The microswitches 106 and 112 may be connected as indicated in Fig. 15 so that when the switch 112 is closed, the switch 106 is opened, so that the red light 106' is on whenever the clutch pedal does not engage either of the switches 106 and 112. Thus the light 106' indicates whenever student is "riding" the clutch.

A brake pedal 114 is pivoted on a block 116, and is held retracted by means of a coiled spring 118. Upon depressing this brake lever it engages a micro-switch 120 to close the circuit connection with a lamp 120'. During the latter part of the braking movement of the brake pedal, it engages a rubber bumper 122 so as to require substantial pressure, thus simulating the application of the brake of a conventional automobile.

An accelerator pedal 124 is pivoted at 126 and is held in raised position by means of a spring 128 coiled about a pin 130 which extends through an aperture in the floorboard. Upon depressing this accelerator, a micro-switch 132 closes the circuit connection with a lamp 132', and maintains the circuit closed until the accelerator is released.

An emergency hand-brake 134 is provided with a rod 136 that is pressed inwardly by means of a spring 138 coiled about the rod and interposed between a pin 139 on the rod and a collar 140 on the frame. The rod 136 is provided with ratchet teeth 142 engaged by a pawl 144, whereby upon turning the hand-brake 134 to disengage the pawl, the brake is forced inwardly by the spring 138 to release the brake. Upon the release of the brake a pin 146 on the rod 136 engages a micro-switch 148 to open circuit with a lamp 148'. When the rod is pulled outwardly to apply the brake a pin 146 disengages from the micro-switch 148 so as to close the circuit with the lamp 148', thus indicating to the instructor when the brake is applied.

The usual direction indicator is provided having an operating handle 150, whereby upon turning the handle in one direction the circuit connection with a switch 152 and lamp 152' is closed indicating a left turn. Upon turning the lever in the opposite direction the circuit is opened, and a circuit connection with a switch 154 and a lamp 154' is closed indicating a right turn.

A horn button 156 on the steering wheel when depressed, closes a circuit with a lamp 158', and when the button is released the circuit is opened.

It will be apparent that any desired number of units may be similarly connected with the master light panel 12. In Fig. 15 three units are illustrated, and in Fig. 1, ten rows of lamps are shown which may be connected with ten units in the manner described.

It will be apparent that the trainer is in the form of a light weight portable facsimile of an automobile driving compartment, including all the essential controls such as a steering wheel, clutch, foot and hand-brakes, gear shift lever, horn, directional signals, and headlight dimmer button. All these components are connected by microswitches so that all the controlled movements register on the master panel 12. This panel is so designed that the instructor sitting at his desk can supervise as many as ten or more of these trainers operating simultaneously. The trainer provides a maximum of realistic training experience for the driver-education students. It is especially designed to develop the skills necessary for meeting emergency situations that are likely to be encountered in driving an automobile. Each trainer may be easily converted into a serviceable desk when not being used for training, and thus the space used for a battery of the trainers can also be used for class room purposes.

What we claim is:

1. Training apparatus of the class described, comprising a set of motor vehicle controls including a steering wheel and column, a compartment in simulation of the driving compartment of a motor vehicle, in which the controls are mounted, said compartment being in the form of a desk having side and rear walls, a top having a rear section and a front section normally inclined downwardly and forwardly from the rear section and hingedly connected to the rear section so as to permit it to be swung upwardly over the rear section, a steering wheel removably secured on the steering column, a hinged connection between the lower end of the steering column and said compartment whereby the column may be lowered from its normal upwardly and forwardly inclined position downwardly to a predetermined position, means for retaining the steering column in said positions, the steering column in its normal position extending above the level of said hinge section when in its normal position, and below said level when in its lowered position, a plurality of signal indicating devices remote from the controls, and means responsive to the operation of the controls for operating said indicating devices to indicate the positions of the controls, respectively.

2. A portable unit for training apparatus of the class described comprising a base, and a compartment and a seat mounted on the base in simulation of the driving compartment and seat of an automobile, a plurality of controls mounted in the compartment comprising a steering column, a steering wheel removably mounted on the upper end of the column, said compartment comprising side and rear walls and a top having a rear section and a front section hinged to the rear section to permit it to be swung upwardly over the rear section from its normal downwardly and forwardly inclined position, and a hinged connection between the lower end of the steering column and the compartment to permit the column to be swung downwardly to a predetermined position, means for retaining the column in said positions, a plurality of signal indicating devices remote from the controls, and means responsive to the operation of the controls for operating said indicating devices to indicate the positions of the controls respectively.

References Cited in the file of this patent

UNITED STATES PATENTS

| Number | Name | Date |
|---|---|---|
| 418,522 | Kiefer | Dec. 31, 1889 |
| 427,217 | Bancroft | May 6, 1890 |
| 1,564,138 | Rowland | Dec. 1, 1925 |
| 1,922,746 | Reeder | Aug. 15, 1933 |
| 2,260,432 | Brown | Oct. 28, 1941 |
| 2,269,444 | Durham | Jan. 13, 1942 |
| 2,273,091 | De Silva | Feb. 17, 1942 |
| 2,324,833 | Gold | July 20, 1943 |
| 2,344,454 | Plotner | Mar. 14, 1944 |